US008959432B2

(12) United States Patent
Sharkey

(10) Patent No.: US 8,959,432 B2
(45) Date of Patent: *Feb. 17, 2015

(54) UTILIZING DOCUMENT STRUCTURE FOR ANIMATED PAGINATION

(75) Inventor: Jeffrey Allen Sharkey, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/249,538

(22) Filed: Sep. 30, 2011

(65) Prior Publication Data

US 2012/0110442 A1    May 3, 2012

Related U.S. Application Data

(63) Continuation of application No. 13/113,528, filed on May 23, 2011.

(60) Provisional application No. 61/407,179, filed on Oct. 27, 2010.

(51) Int. Cl.
*G06F 17/00* (2006.01)
*G06F 17/21* (2006.01)
*G06F 17/24* (2006.01)
(Continued)

(52) U.S. Cl.
CPC ............ *G06F 17/217* (2013.01); *G06F 17/212* (2013.01); *G06F 17/241* (2013.01); *G06T 13/00* (2013.01); *G06T 11/60* (2013.01); *G06T 13/80* (2013.01)
USPC ........... 715/251; 715/200; 715/204; 715/234; 715/273; 715/784; 715/786; 715/788; 715/230

(58) Field of Classification Search
CPC .... G06F 17/212; G06F 17/217; G06F 17/241
USPC ......... 715/200, 204, 234, 247, 273, 251, 784, 715/786, 788, 241
See application file for complete search history.

(56) References Cited

U.S. PATENT DOCUMENTS 6,157,381 A * 12/2000 Bates et al. ................... 715/786
6,803,930 B1 * 10/2004 Simonson ..................... 715/784
(Continued)

OTHER PUBLICATIONS

U.S. Appl. No. 13/113,528, by Jeffrey Allen Sharkey, filed May 23, 2011.
(Continued)

*Primary Examiner* — Chau Nguyen
*Assistant Examiner* — David Faber
(74) *Attorney, Agent, or Firm* — Shumaker & Sieffert, P.A.

(57) ABSTRACT

In general, this disclosure describes techniques for visually emphasizing information displayed on a computing device. In one example, a method that includes receiving a first portion of a document for display by the computing device, the first portion of the document including multiple elements separated by one or more delimiters. The method further includes dividing the multiple elements into a first set of one or more elements, each of which is displayable in its entirety at a time of display of the first portion of the document, and a second set of at least one element, the at least one element not displayable in its entirety at the time of display of the first portion of the document. The method further includes generating for display the first portion of the document, including visually emphasizing the first set of elements with respect to the second set of elements.

19 Claims, 7 Drawing Sheets

(51) Int. Cl.
*G06T 13/00* (2011.01)
*G06T 11/60* (2006.01)
*G06T 13/80* (2011.01)

(56) References Cited

U.S. PATENT DOCUMENTS

| | | | | |
|---|---|---|---|---|
| 7,475,360 | B2* | 1/2009 | Keohane et al. | 715/786 |
| 7,512,879 | B2* | 3/2009 | Weil et al. | 715/251 |
| 7,574,675 | B1* | 8/2009 | Linker et al. | 715/841 |
| 7,770,130 | B1* | 8/2010 | Kaptelinin | 715/787 |
| 2002/0126154 | A1* | 9/2002 | Watson | 345/784 |
| 2002/0186251 | A1* | 12/2002 | Himmel et al. | 345/784 |
| 2003/0011631 | A1* | 1/2003 | Halahmi | 345/744 |
| 2004/0205623 | A1* | 10/2004 | Weil et al. | 715/525 |
| 2006/0038796 | A1* | 2/2006 | Hinckley et al. | 345/173 |
| 2006/0224955 | A1* | 10/2006 | Makela | 715/526 |
| 2007/0061738 | A1* | 3/2007 | Taboada et al. | 715/752 |
| 2007/0157086 | A1* | 7/2007 | Drey | 715/531 |
| 2008/0086303 | A1* | 4/2008 | Sengamedu | 704/231 |
| 2008/0141126 | A1* | 6/2008 | Johnson et al. | 715/273 |
| 2008/0320396 | A1* | 12/2008 | Mizrachi et al. | 715/744 |
| 2009/0144654 | A1* | 6/2009 | Brouwer et al. | 715/802 |
| 2010/0122205 | A1* | 5/2010 | Jarrett et al. | 715/784 |
| 2010/0125807 | A1* | 5/2010 | Easterday et al. | 715/785 |
| 2010/0332977 | A1* | 12/2010 | Nelson et al. | 715/273 |
| 2011/0214088 | A1* | 9/2011 | Sandru | 715/785 |

OTHER PUBLICATIONS

International Search Report and Written Opinion of the International Search Authority, for corresponding International Application No. PCT/US2011/057719, mailed Dec. 23, 2011, (9 pages).
Office Action from U.S. Appl. No. 13/113,528, dated Dec. 12, 2011, 18 pp.
International Preliminary Report on Patentability from international application No. PCT/US2011/057719, mailed May 10, 2013, 8 pp.
Office Action from U.S. Appl. No. 13/113,528, dated Mar. 23, 2012, 18 pp.
Response to Office Action dated Dec. 12, 2011, from U.S. Appl. No. 13/113,528, filed Mar. 9, 2012, 14 pp.
Response to Office Action dated Mar. 23, 2012, from U.S. Appl. No. 13/113,528, filed May 23, 2012, 13 pp.
Office Action from U.S. Appl. No. 13/113,528, dated May 29, 2014, 16 pp.
Response to Office Action from U.S. Appl. No. 13/113,528, dated May 29, 2014, filed Aug. 21, 2014, 13 pp.

* cited by examiner

This is a portion of a document. The entire document may not be viewable on the screen. But some of it may. Some of the text may be emphasized while other portions of the text may be deemphasized. There may be additional text that does not fit on a single screen. There may also be graphics or other document elements that may change the formatting and display of the information on a display.
    Various delimiters may be used to divide the text. As examples, a comma, a colon, a semi-colon, or a period may be used to divide the text.

UTILIZING DOCUMENT STRUCTURE FOR ANIMATED PAGINATION

RELATED APPLICATIONS

This application is a continuation of U.S. application Ser. No. 13/113,528, filed May 23, 2011, which claims the benefit of U.S. Provisional Application No. 61/407,179, filed Oct. 27, 2010, the entire contents of each of which are incorporated by reference herein.

TECHNICAL FIELD

This disclosure relates to displaying information on computing devices, such as personal computers, tablet computers, ebook readers, and cellular telephones.

BACKGROUND

Modern computing devices may include a display for displaying information. In some instances, the computing devices may not be able to display all of the information at once, such as when displaying large bodies of text. Each set of information capable of being displayed simultaneously on the computing device display may be referred to as a "page" of information. Conventionally, computing devices are configured to fit as many lines as possible onto a single page when displaying bodies of text or other information larger than a single page.

SUMMARY

In general, this disclosure describes techniques for visually emphasizing (e.g., highlighting) complete textual blocks (e.g., sentences) of a document that are completely visible on a display screen, and visually de-emphasizing (e.g., dimming) any other textual blocks (e.g., partial sentences) that may be partially occluded by screen or window boundaries of a display. When a user invokes a change page action, e.g., a "next page" or "scroll" action, the techniques of this disclosure may modify the view of or scroll the document according to the amount of content for the complete textual blocks that were previously displayed, using an animated transition to keep the user's eye in line with where the user can resume reading.

In one example, a method includes receiving a first portion of a document for display by the computing device, the first portion of the document including multiple elements separated by one or more delimiters. The method also includes dividing, by the computing device, the multiple elements into 1) a first set of one or more elements, each of which is displayable in its entirety at a time of display of the first portion of the document, and 2) a second set of at least one element, the at least one element not displayable in its entirety at the time of display of the first portion of the document. The method also includes generating for display by the computing device the first portion of the document, wherein generating for display includes visually emphasizing the first set of elements with respect to the second set of at least one element.

In another example, a computer-readable storage medium is encoded with instructions that if executed by one or more programmable processors of a computing device cause the computing device to perform operations. The operations include receiving a first portion of a document for display by the computing device, the first portion of the document including multiple elements separated by one or more delimiters. The operations further include dividing the multiple elements into a first set of one or more elements, each of which is displayable in its entirety at a time of display of the first portion of the document, and a second set of at least one element, the at least one element not displayable in its entirety at the time of display of the first portion of the document. The operations further include generating for display by the computing device the first portion of the document, wherein generating for display includes visually emphasizing the first set of elements with respect to the second set of at least one element.

In another example, a device includes one or more programmable processors, and a parsing module executable by the one or more programmable processors to receive a first portion of a document for display by the device, the first portion of the document including multiple elements separated by one or more delimiters, divide the multiple elements into 1) a first set of one or more elements, each of which is displayable in its entirety at a time of display of the first portion of the document, and 2) a second set of at least one element, the at least one element not displayable in its entirety at the time of display of the first portion of the document. The device further includes means for generating for display by the device the first portion of the document, wherein generating for display includes visually emphasizing the first set of elements with respect to the second set of at least one element.

The techniques of this disclosure may provide one or more advantages. For example, by emphasizing or de-emphasizing information based on complete thoughts, e.g., complete sentences, the reader may naturally trigger the "next page" action when at the end of a complete thought. When triggering a "next page" action at the end of a complete thought, the reader, in various instances, may more easily follow the text to where the reader should begin reading again. Thus, these techniques may reduce the fatigue experienced by a user when reading text for a prolonged period of time.

The details of one or more embodiments of this disclosure are set forth in the accompanying drawings and the description below. Other features, objects, and advantages of this disclosure will be apparent from the description and drawings, and from the claims.

BRIEF DESCRIPTION OF DRAWINGS

FIGS. 3A-3C are conceptual diagrams illustrating example information displays, in accordance with one aspect of the present disclosure.

Like reference symbols in the various drawings indicate like elements.

DETAILED DESCRIPTION

When a user is reading or otherwise examining the information displayed on the screen, the user is often left hanging mid-thought (e.g., mid-sentence) for about a second as the user flips the page and his or her eyes find the top-left corner of the page. The combination of these unnatural mid-thought breaks and the delay in the human eye settling to its new starting location after a page turn can subconsciously fatigue the user with prolonged reading. By emphasizing or de-emphasizing information based on complete thoughts, the techniques of this disclosure may enable the user to more easily follow the text to where the user should begin reading again. Thus, these techniques may reduce the fatigue experience by the user when reading for a prolonged period of time.

Figure 1:
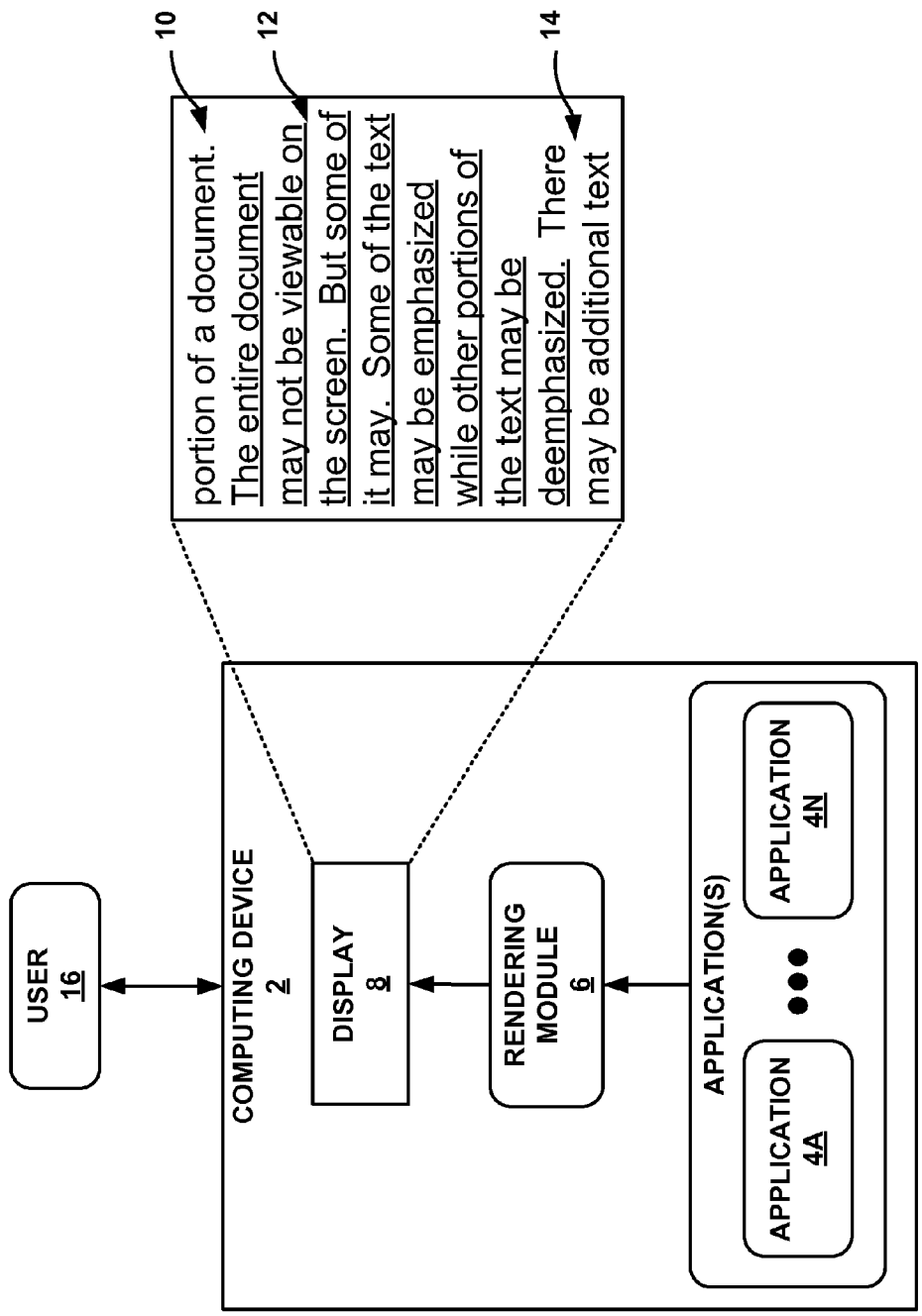
FIG. 1 is a conceptual diagram illustrating an example computing device with example information displayed, in accordance with one aspect of the present disclosure.

FIG. 1 is a conceptual diagram illustrating an example computing device 2 with example information displayed, in accordance with one aspect of the present disclosure. Computing device 2 may comprise one or more stand-alone devices or may be part of a larger system. In certain examples, computing device 2 may comprise a mobile device. For instance, computing device 2 may comprise or be part of a wireless communication device (e.g., wireless mobile handset or device), a video telephone, a digital multimedia player, a personal digital assistant (PDA), a video game console, a laptop computer, or other device. In some instances, computing device 2 may communicate with external, distinct devices via one or more networks (not shown), such as one or more wired or wireless networks, which may, in some cases, provide access to the Internet.

As shown in the example of FIG. 1, computing device 2 may include one or more applications 4A-4N, rendering module 6, and display 8. Applications 4A-4N (collectively, "applications 4") and rendering module 6 may be executed by computing device 2 (e.g., by one or more processors included within computing device 2, as described in more detail with respect to FIG. 2). Display 8 may present images to user 16 and may be further configured to detect touch-based input from user 16. User 16 may initiate functionality of the device and input content by interacting with display 8.

Each of applications 4 is operable on computing device 2 to perform one or more functions during execution. For example, one or more of applications 4 may comprise a web application that interacts and/or exchanges data with a device that is external to computing device 2. A web application may, in some instances, be executable within a web browser that is operable on computing device 2. Computing device 2 may, in various instances, download or otherwise obtain one or more of applications 4 from an external server via one or more networks (not shown). For instance, a web browser hosted by computing device 2 may download one or more of applications 4 upon access of one or more web sites hosted by such as external server (e.g., web server).

During execution, any of applications 4 may implement, invoke, execute, or otherwise utilize rendering module 6 and display 8 to render and display information utilized by one or more of applications 4 to user 16. For instance, if application 4A is a web browser application, application 4A may invoke rendering module 6 to render a web page for display on display 8, which is viewable by user 16. In another example, if application 4N is an e-reader application, application 4N may invoke rendering module 6 to render pages of an ebook for display on display 8.

In accordance with one or more techniques of this disclosure, rendering module 6 may format the information to be displayed on display 8. In some examples, such as when a web browser retrieves a web page for display, rendering module 6 may reformat information for display on display 8. By reformatting the information to be displayed, rendering module 6 may provide a better viewing experience for user 16. Rendering module 6 may generate device specific formatting for the information. That is, rendering module 6 may process the information and format the information based upon the physical characteristics of display 8 and/or based on configuration parameters stored within computing device 2.

Rendering module 6 may format the information in a number of different manners. In one example, rendering module 6 may format a combination of text and images such that the images are not simultaneously displayed with text, but rather fill the entire screen of display 8. In another example, certain portions of displayed text are emphasized while other portions of the displayed text are not emphasized or are de-emphasized. When selecting which portions of text to emphasize, rendering module 6 may use punctuation, such as a comma, a semi-colon, a colon, a hyphen, or a period, as a delimiter between the portion of text that is emphasized and the other portions of text that are not emphasized. Rendering module 6 may also analyze the semantic information of the text itself to identify conceptual boundaries, such as those implied by grammar, and use the identified conceptual boundaries as delimiters between the portion of text that is emphasized and the other portions of text that are not emphasized. The conceptual boundaries may be particularly useful when rendering non-English languages and for long run-on sentences.

Figure 3A:
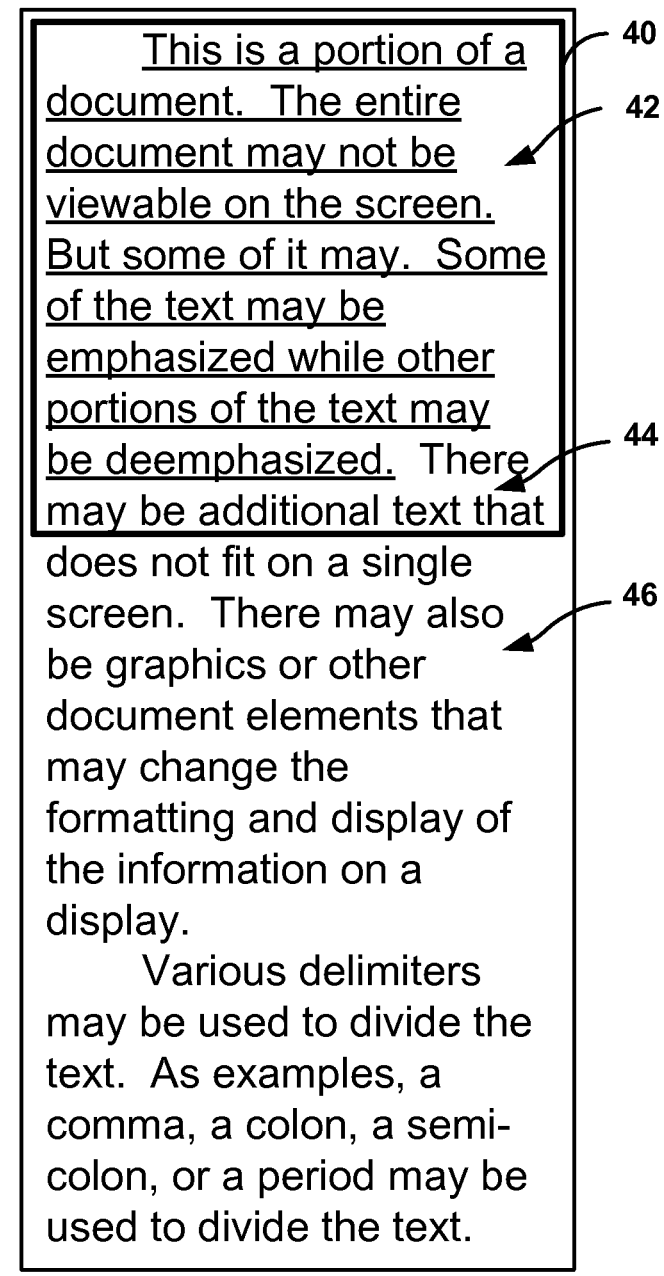
Figure 3B:
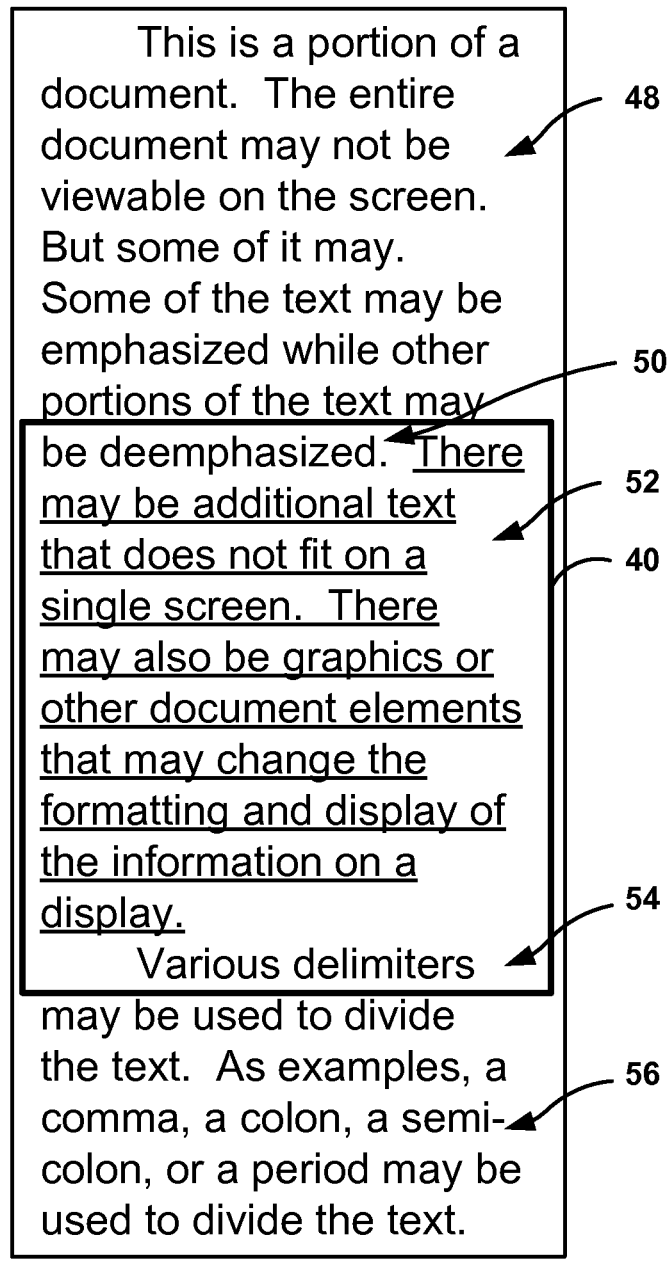

When the information to be displayed includes more information than may be simultaneously displayed on display 8, e.g., there is more information that fits within a single "page" being shown to user 16 on display 8, rendering module 6 may format the information to be displayed on a page-by-page basis, the details of which are further described with respect to FIGS. 3A-3C. For example, rendering module 6 formats a first page of information to display. Upon user 16 entering a change page action, e.g., a next page action, rendering module 6 may reformat a portion of the information previously displayed, e.g., de-emphasize previously emphasized information, and emphasize or de-emphasize various portions of information not previously displayed.

After formatting the information, rendering module 6 sends the information to display 8 for display to user 16. In the example illustrated in FIG. 1, display 8 is displaying text, which may be a portion of a larger document. The text includes three distinct portions, text portions 10 and 14, which are not emphasized, and text portion 12, which is emphasized by underlining the text (according to the particular example of FIG. 1). As illustrated, rendering module 6 selected which portions of the displayed text to emphasize or not emphasize based on a punctuation delimiter, i.e., a period. Text portion 10 may include a portion of a sentence that was previously displayed as a portion of a prior page. Similarly, text portion 14 may include a portion of a sentence that will be fully displayed after user 16 performs a next page action. Text portion 12 includes emphasized text located between two distinct occurrences of the delimiter, i.e., between two or more different periods.

In this manner, one or more techniques of this disclosure may emphasize or de-emphasize text based on complete thoughts, e.g., complete sentences, encouraging user 16 to trigger the "next page" action when at the end of a complete thought. When triggering a "next page" action at the end of a complete thought, user 16, in various instances, may more easily follow the text to where user 16 should begin reading again. Thus, these techniques may reduce the fatigue experience by user 16 when reading text for a prolonged period of time.

Figure 2:
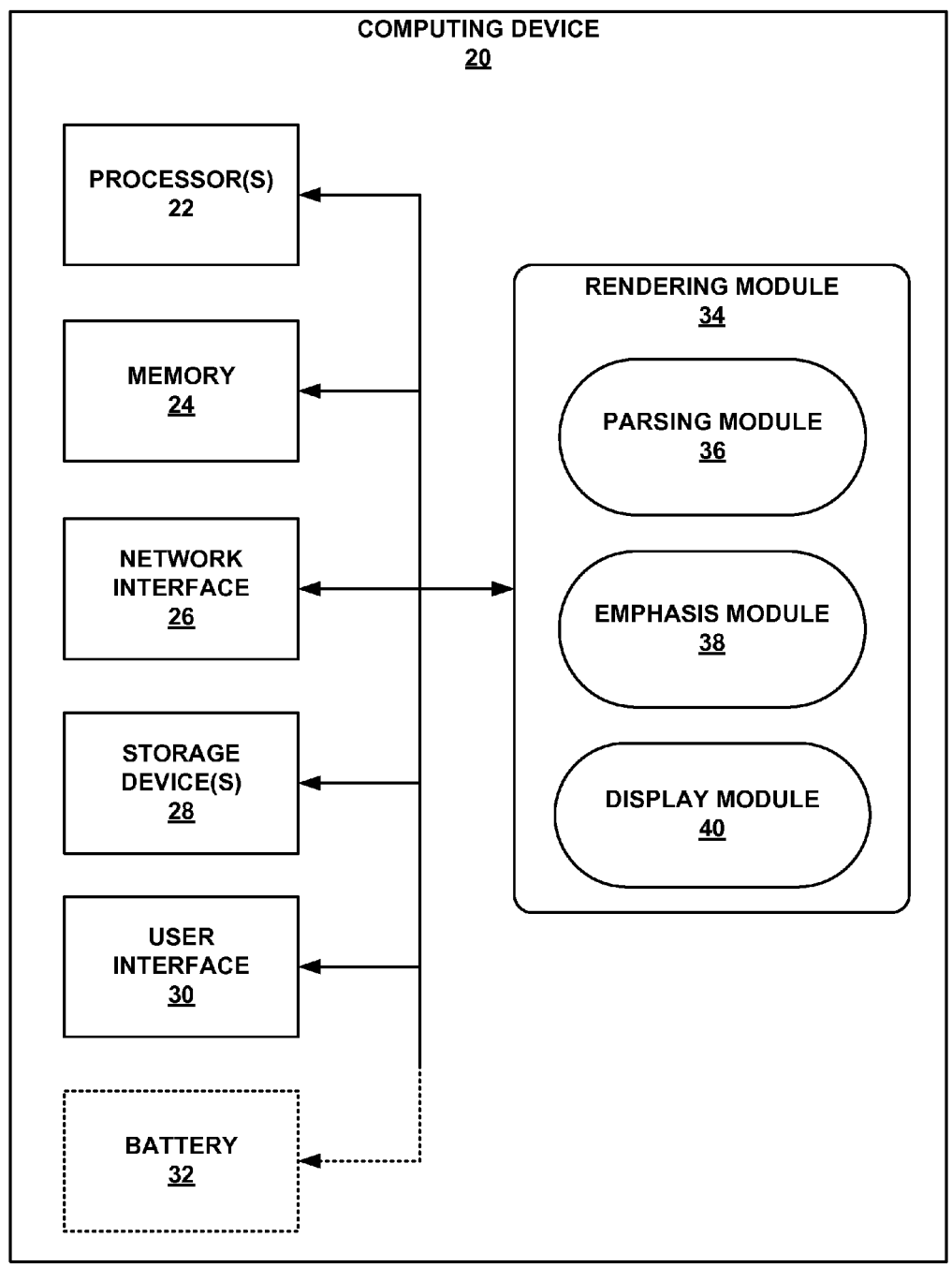
FIG. 2 is a block diagram illustrating further details of an example computing device that displays information, in accordance with one aspect of the present disclosure.

FIG. 2 is a block diagram illustrating further details of an example computing device 20 that displays information, in accordance with one aspect of the present disclosure. As shown in the specific example of FIG. 2, computing device 20 includes one or more processors 22, memory 24, a network interface 26, one or more storage devices 28, user interface 30, and an optional battery 32. For instance, if computing device 20 comprises a mobile device, computing device 20 may include battery 32. Each of components 22, 24, 26, 28, 30, and 32 may be interconnected via one or more busses for inter-component communications. Processors 22 may be configured to implement functionality and/or process instructions for execution within computing device 20. Processors 22 may be capable of processing instructions stored in memory 24 or instructions stored on storage devices 28.

User interface 30 may include, for example, a monitor or other display device for presentation of visual information to a user of computing device 20. User interface 30 may further include one or more input devices to enable a user to input data, such as a manual keyboard, mouse, touchpad, trackpad, etc. In some example, user interface 30 may comprise a touchscreen, which may be used both to receive and process user input and also to display output information. User interface 30 may further include printers or other devices to output information. In various instances in the description contained herein, references made to user interface 30 may refer to portions of user interface 30 (e.g., touchscreen, mouse device) that provide user input functionality.

Memory 24 may be configured to store information within computing device 20 during operation. Memory 24 may, in some examples, be described as a computer-readable storage medium. In some examples, memory 24 is a temporary memory, meaning that a primary purpose of memory 24 is not long-term storage. Memory 24 may also be described as a volatile memory, meaning that memory 24 does not maintain stored contents when the computer is turned off. Examples of volatile memories include random access memories (RAM), dynamic random access memories (DRAM), static random access memories (SRAM), and other forms of volatile memories known in the art. In some examples, memory 24 may be used to store program instructions for execution by processors 22. Memory 24 may be used by software or applications running on computing device 20 (e.g., one or more of applications 4 shown in FIG. 1) to temporarily store information during program execution.

Storage devices 28 may also include one or more computer-readable storage media. Storage devices 28 may be configured to store larger amounts of information than memory 24. Storage devices 28 may further be configured for long-term storage of information. In some examples, storage devices 28 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 20 also includes network interface 26. Computing device 20 may utilize network interface 26 to communicate with external devices (e.g., one or more servers, web servers) via one or more networks. Any applications implemented within or executed by computing device 20, e.g., applications 4 shown in FIG. 1, may be implemented or contained within, operable by, executed by, and/or be operatively coupled to processors 22, memory 24, network interface 26, storage devices 28, and/or user interface 30.

One example rendering module 34 is shown in FIG. 2. Rendering module 34 may comprise one example of rendering module 6 shown in FIG. 1 and may include parsing module 36, and emphasis module 38, and display module 40. Rendering module 34 may format information for display 8 shown in FIG. 1, e.g., via user interface 30. Rendering module 34 may be stored in memory 24 and/or storage device 30, and may be operable by processors 22 to perform various tasks during execution.

Rendering module 34 may receive information to display via user interface 30 from applications executed by computing device 20. Upon receiving the information to display, parsing module 36 may analyze the information to display and parse the information based upon one or more delimiters. Parsing the information may identify potential locations within the information to be displayed that may serve as transition points for purposes of pagination, emphasis, or other formatting techniques. In one example, parsing module 36 is configured to parse the information based upon detecting an image, any punctuation mark, or a new paragraph, parsing module 36 identifies each image, punctuation mark, or new paragraph located within the information to be displayed. In another example, parsing module 36 is configured to parse the information based upon the period punctuation mark. In this example, the end of each sentence located within the information to be displayed is identified as a potential transition point. Any element of the information to be displayed may be used as a delimiter.

In some examples, parsing module 36 may include various delimiters that each have different a priority level. That is, parsing module 36 may be configured to prioritize one delimiter over a different delimiter when identifying locations within the information to be displayed as potential transition points. For example, a new paragraph may have the highest priority, a period the second highest priority, a colon the third highest priority, and so on. Assigning different priorities may be useful to further control the display of the information. For example, when the amount of information located between delimiters of the same priority level exceeds the amount of information that may be displayed within a single page via user interface 30, rendering module 34 may move to a next lower priority level delimiter when formatting the information. By assigning various delimiters particular priority levels, a programmer may better control how the information is presented to a user.

After identifying the particular delimiters within the information to be displayed, parsing module 36 may then be configured to determine where a page of information begins and ends within all of the information to be displayed. A page of information, in some examples, may be the total amount of information that may be simultaneously displayed to a user via user interface 30. In order to determine where the pages are located within the information, parsing module 36 may be configured with information about user interface 30, such as pixel density and resolution of a display, the font type and sizes, and character, line, and paragraph spacing. Parsing module 36 may utilize the information about user interface 30 as well as the identified transition points to identify the pages within the information to be displayed and to format the information included within each page. In general, when the information to be displayed includes text, a portion of the text from one page may be included in the next page of text such that there is some overlap of text between the two adjacent pages.

Parsing module 36 may send the parsed information to emphasis module 38 for further formatting. Emphasis module 38 may be configured to identify complete elements within each page of information. A complete element includes information occurring between two distinct occurrences of delimiters within a page of information. In the examples where each delimiter is assigned a particular priority, a complete element may include information occurring between two distinct occurrences of each delimiter of the same priority level or, in some examples, the same priority level or a higher priority level. An incomplete element may include information occurring before the first occurrence of a delimiter within a page or after the last occurrence of the delimiter within in a page.

In general, emphasis module 38 emphasized the complete elements located within each page. The complete elements may be emphasized, for example, by underlining, bolding, italicizing, highlighting, changing the size, font, or color of text within the complete elements, or any other manner in which complete elements may be differentiated from incomplete elements. Emphasis module 38 may also de-emphasize incomplete elements located within each page. The incomplete elements may be de-emphasized by changing the color of the text to a lighter shade of the color of the emphasized text, by reducing the size of the font, or in any other manner that may reduce or minimize the appearance of the incomplete elements as compared to the complete elements.

Each page of information typically includes at least one complete element and at least one incomplete element. However, when there is more information between delimiters than will fit within a single page, an entire page may include an incomplete element, but no complete elements. If there are no complete elements, emphasis module 38 may emphasis each line of information included in the display except, for example, a first line and a last line.

Display module 40 may receive the parsed and emphasized information from emphasis module 38 and provide the information to user interface 30 a page at a time for display to a user. When a user interacts with computing device 20 to initiate a page change action, e.g., a next page action, display module 40 provides the page of information that corresponds to the page change action to user interface 30. The user may interact with computing device 20 to initiation the page change action by, for example, squeezing computing device 20 or interacting with user interface 30. In one example, computing device 20 may include a front-facing camera that tracks the user's eyes. When the user's eyes are determined to reach the transition area (e.g., the end of the emphasized information), computing device 20 may initiate a page change action.

Display module 40 may be configured to cause user interface 30 to perform particular transitions when changing pages. For example, display module 40 may cause user interface 30 to fade the emphasized information from the formatting associated with emphasized information to the format associated with de-emphasized information. Display module 40 may be further configured to fade any de-emphasized information located within the page after the emphasized information from the format associated with de-emphasized information to the format associate with emphasized information.

Display module 40 may also cause user interface 30 to perform page change transitions, such as scrolling the text from the bottom of the user interface 30 to the top of user interface 30 in response to a next page action. Other change page actions may cause different page change transitions. As examples, the page change transition may appear as if a physical page is being turned, the text may scroll from the top towards the bottom, the text may fade in and out, the text may slide in from the left or right, or any of the well known graphic transitions.

FIGS. 3A-3C are conceptual diagrams illustrating example information displays, in accordance with one aspect of the present disclosure. For purposes of illustration only, the conceptual diagrams of FIGS. 3A-3C are described with respect to computing device 20 of FIG. 2, though various other systems and/or devices may be utilized to generate and display the information depicted in FIGS. 3A-3C. The text included in FIGS. 3A-3C is an example of a text document that may be processed by rendering module 34 and displayed to a user via user interface 30. While illustrated as only displaying text information, other information may be parsed and display including images, graphics, and video.

Rendering module 34 may receive the text from an application executing on computing device 20, e.g., application 4A of FIG. 1. In the example illustrated in FIGS. 3A-3C, parsing module 36 parses the text based upon a single delimiter, a period. As described above, other characters, including other punctuation marks, may be used as delimiters and more than one delimiter may be used by parsing module 36 when parsing the information to be displayed. As also illustrated in FIGS. 3A-3C, emphasis module 38 emphasizes complete elements of the text by underlining the complete elements. In other examples, emphasis module 38 may bold, italicize, highlight, or otherwise change the format of the emphasized information.

Referring to FIG. 3A, the information displayed within a single screen, e.g. a page of information, is displayed on display screen 40. The text displayed on display screen 40 includes emphasized text 42 and de-emphasized text 44. De-emphasized text 44 may include information that is not emphasized or may include information that is formatted to minimize the appearance of the text to a user. The remainder of the document that has not yet been displayed on display screen 40 is represented as undisplayed text 46. In this example, because parsing module 36 parsed the text based on a period delimiter, emphasis module 38 applied the underline emphasis only to complete sentences. Emphasized text 42 begins with the start of a sentence and ends at the end of a sentence. De-emphasized text 44 begins that the start of the first sentence following the last sentence of emphasized text 42 and does not include a complete element. Rather, de-emphasized text 44 includes only a portion of a sentence.

The conceptual diagram illustrated by FIG. 3B may be generated after a user causes a next page action by interacting with computing device 20 via user interface 30, for example. In FIG. 3B, display screen 40 displays the next page of the document. The portion of the document that was previously displayed as emphasized text and that is not currently displayed on display screen 40 is identified as previously displayed text 48. A portion of the last sentence that was previously emphasized is included within display screen 40 as de-emphasized previously displayed text 50. A programmer may configure the number of lines of de-emphasized previously displayed text 50 to include within each display screen 40 as a user moves through a document. By including a portion of the previously emphasized text within display 40, a user may be provided context for the next sentence and may more easily be able to follow where to begin reading again after causing a next page action. However, to limit the number of page change actions required to move through a document, the number of lines of de-emphasized previously displayed information 50 may be optimized to include enough information to provide adequate context for the user without requiring the user to perform excessive page change actions.

Emphasized text 52 begins with the first sentence that follows the de-emphasized previously displayed text 50 and ends at the end of the last complete sentence that fits within display screen 40. De-emphasized text 54 includes the incomplete element that follows emphasized text 52. In some examples, a complete element, e.g., a complete sentence, may be the last element or portion of an element within display screen 40. In these examples, de-emphasized text 54 may include the last complete element displayed within display screen 40. That is, while de-emphasized text 54 generally does not include complete elements, de-emphasized text 54 may include a complete element when the last element within display screen 40 is a complete element and there exists additional information that has not yet been displayed to the user, e.g., undisplayed text 56.

FIG. 3C may also be generated after a user causes a next page action by, for example, interacting with computing device 20 via user interface 30. In FIG. 3C, display screen 40 displays the last page of the document. Previously displayed text 58 now includes a portion of emphasized text 52 of FIG. 3B as well as all of the previously displayed text 48 of FIG. 3B. As illustrated in FIG. 3C, several lines of de-emphasized previously displayed text 60 are included within display screen 40 and emphasized text 62 includes the remaining text that was not previously displayed.

While described as "undisplayed text" and "previously displayed text," a user may move through the document in any manner and the text included in undisplayed text 46 or undisplayed text 56 may have been previously display while the text included in previously displayed text 48 or previously displayed text 58 may not have been previously displayed. For example, the user may cause the page displayed in display screen 40 of FIG. 3C to be displayed prior to the page displayed in display screen 40 of FIG. 3A. The descriptive phrases "undisplayed text" and "previously displayed text" are used throughout this disclosure merely for convenience and are not intended to limit the manner in which the information in a document may be displayed to a user.

Figure 4:
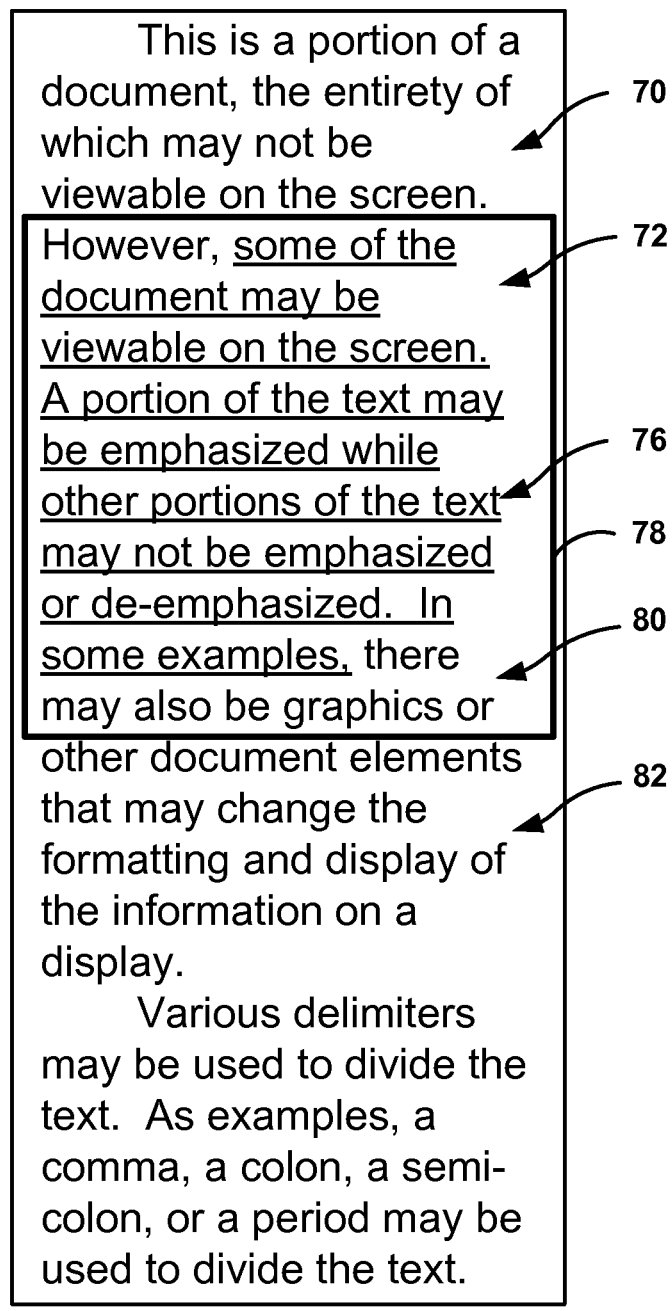
FIG. 4 is a conceptual diagram illustrating another example information display, in accordance with one aspect of the present disclosure.

FIG. 4 is a conceptual diagram illustrating another example information display, in accordance with one aspect of the present disclosure. For purposes of illustration only, the conceptual diagrams of FIG. 4 is described with respect to computing device 20 of FIG. 2, though various other systems and/or devices may be utilized to generate and display the information depicted in FIG. 4.

Similar to the examples illustrated in FIGS. 3A-3C, previously displayed text 60 and de-emphasized previously displayed text 62 are both included as part of a previous page. Each page of text, as determined by parsing module 36, typically includes portions of both the previous page and the next page such that each page overlaps. The overlapping information may be illustrated as the de-emphasized information at the top and bottom of each page, e.g., de-emphasized previously displayed text 62 and de-emphasized text 70. In contrast, undisplayed text 72 includes the text occurring in pages following the page currently displayed in display screen 40 and does not include text that is currently displayed in display screen 40.

In the example illustrated in FIG. 4, parsing module 36 parsed the document based on a single delimiter, a comma. Therefore, emphasized text 66 begins with the first word after a comma and ends at a comma and de-emphasized text begins with the first word after the comma at the end of emphasized text 66. Other delimiters, such as a new paragraph character, a semi-colon, a colon, or a hyphen may be used to parse the information with parsing module 36, enabling emphasis module 38 to appropriately format the information within each page. In some examples, an artificial character, such as a solid square, may be inserted into the document and used as a delimiter to parse the information with parsing module 36.

Figure 5:
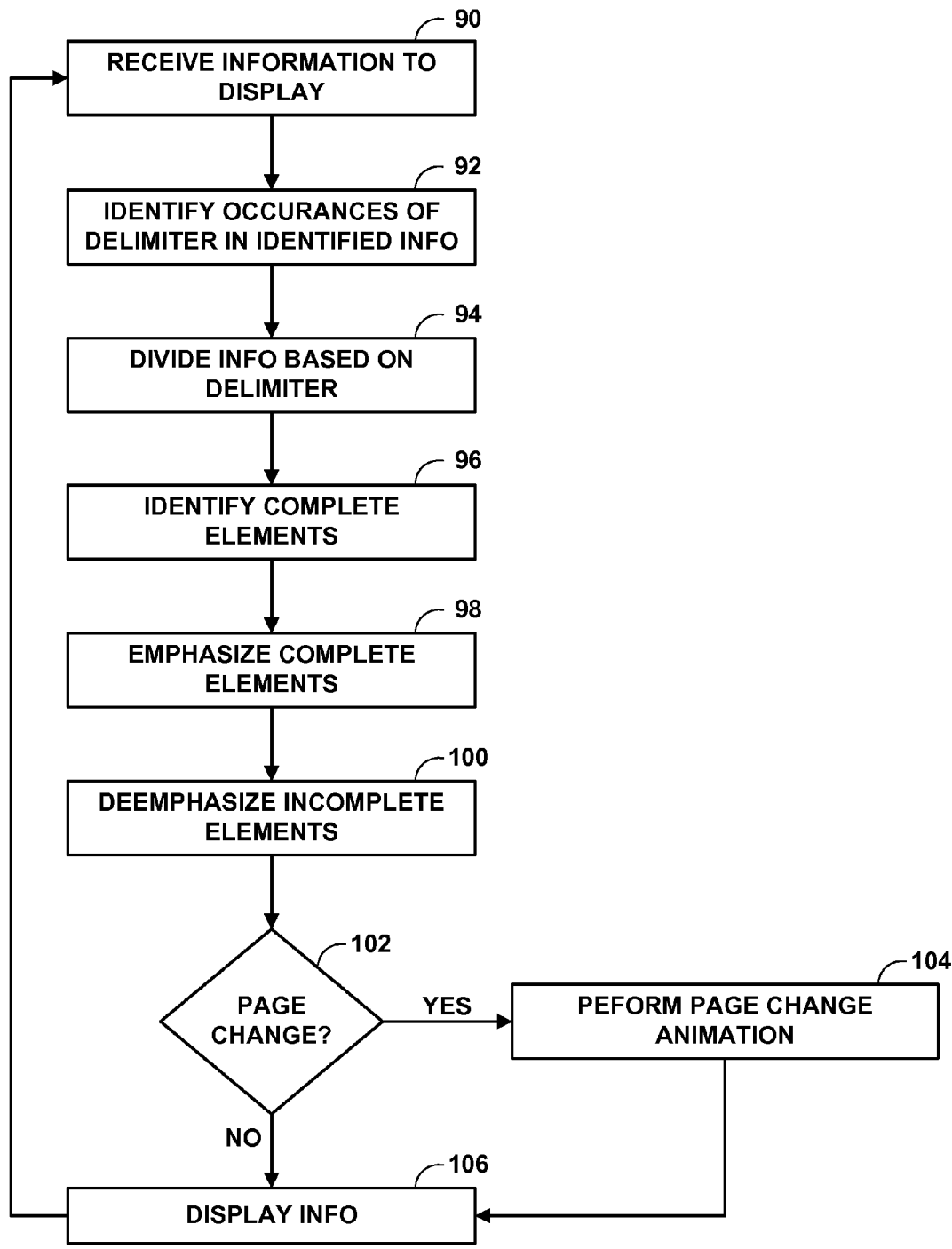
FIG. 5 is a flow chart illustrating an example method for displaying information on a computing device, in accordance with one aspect of the present disclosure.

FIG. 5 is a flow chart illustrating an example method for displaying information on a computing device, in accordance with one aspect of the present disclosure. For purposes of illustration only, the method of FIG. 5 is described with respect to computing device 20 of FIG. 2, though various other systems and/or devices may be utilized to implement or perform the method shown in FIG. 5. In the example illustrated in FIG. 5, rendering module 34 of computing device 20 receives the information to display via user interface 30 (90). The information to display may be received from an application executing on computing device 20 and/or may be stored within memory 24 or storage devices 28 of computing device 20.

Upon receiving the information to display (90), parsing module 36 of rendering module 34 identifies the occurrences of one or more delimiters within the information to display (92). In some examples, parsing module 36 may be pre-configured to identify certain delimiters. In other examples, the application passing the information to display to rendering module 34 may also pass configuration information identifying the delimiters and any relative priority associated with each delimiter to rendering module 34. Parsing module 36, after identifying the occurrences of the delimiters in the information to be displayed, divides the information into pages based, at least in part, on the delimiters (94). Parsing module 36 may also divide the information based upon the particular configuration of user interface 30, e.g., the number of pixels within a display of user interface 30, the physical size of the display, the number of pixels per inch used to render the information, the font size, the character, line, and font spacing, among other configuration options.

In the example illustrated in FIG. 5, emphasis module 38 then identifies the complete elements within each page of the information to be displayed (96). As described above, a complete element may include information occurring between two distinct occurrences of delimiters within a page of information. In the examples where each delimiter is assigned a particular priority, a complete element may include information occurring between two distinct occurrences of each delimiter of the same priority level or the same priority level and a higher priority level. An incomplete element may include information occurring before the first occurrence of a delimiter within a page or after the last occurrence of the delimiter within in a page.

After identifying the complete elements within each page (96), emphasis module 38 applies formatting to the complete elements to emphasize the complete elements (98). The complete elements may be emphasized, for example, by underlining, bolding, italicizing, highlighting, changing the size, font, or color of text within the complete elements, or any other manner in which complete elements may be differentiated from incomplete elements. In some examples, emphasis module 38 applies additional formatting to incomplete elements to de-emphasize the incomplete elements located within each page (100). The incomplete elements may be de-emphasized by changing the color of the text to a lighter shade of the color of the emphasized text, by reducing the size of the font, or in any other manner that may reduce or minimize the appearance of the incomplete elements as compared to the complete elements.

Rendering module 34 then determines whether the command that caused the information to be sent to rendering module 34 was a page change command or some other command (102). If the command was a page change command ("YES" branch of 102), then display module 40 may cause user interface 30 to perform one or more page change animations based on whether the command was a next page command, previous page command, or some other page change command (104). For example, if the user causes a next page action to be performed, previously emphasized information may be de-emphasized, previously de-emphasized information located below the previously emphasized information may become emphasized, and the information may scroll in the direction moving from the bottom portion of user interface 30 to the top portion of user interface 30. As another example, if the user causes a previous page action to be performed, previously emphasized information may be de-emphasized, previously de-emphasized information located above the previously emphasized information may become emphasized, and the information may scroll in the direction moving from the top portion of user interface 30 to the bottom portion of user interface 30. If the command was not a page change command ("NO" branch of 102) or after display module 40 causes user interface 30 to perform the page change animations, display module 40 then causes user interface 40 to display the particular page of information (106).

In this manner, the techniques of this disclosure may reduce the fatigue experienced by a user when consuming information over a prolonged period of time. By emphasizing and/or de-emphasizing text based on complete elements, which may correspond with complete thoughts, the user may be encouraged to trigger a "next page" action when at the end of a complete thought. When triggering a "next page" action at the end of a complete thought, the user, in various instances, may more easily follow the text to where the user should begin reading again, which may reduce the fatigue experienced by the user.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as RAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be software and/or firmware executed by processing circuitry including one or more processors, such as one or more digital signal processors (DSPs), general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

The invention claimed is:

1. A method performed by a computing device having a processor, the method comprising:
   receiving a first portion of a document for display by the computing device, the first portion of the document including multiple elements separated by one or more first delimiters;
   dividing, by the computing device, the multiple elements into
      1) a first set of one or more elements, wherein all of the elements of the first set of one or more elements are simultaneously displayed in its entirety at a time of display of the first portion of the document, and
      2) a second set of at least one element, wherein all of the elements of the second set of at least one element cannot be simultaneously displayed in its entirety at the time of display of the first portion of the document, and wherein the second set of at least one element does not include any elements included in the first set of one or more elements;
   dividing, by the computing device, a first element of the second set of elements into a set of sub-elements based on a second delimiter, wherein each sub-element of the set of sub-elements includes information from the first element occurring
      1) prior to and including a first occurrence of the second delimiter within the first element,
      2) between two distinct occurrences of the second delimiter and including a latter occurrence of the two distinct occurrences of the second delimiter in the first element, or
      3) after a last occurrence of the second delimiter;
   determining which sub-elements of the set of sub-elements are complete sub-elements based on the second delimiter, wherein a complete sub-element comprises a sub-element that includes information occurring between two distinct occurrences of the second delimiter within the first element, or a sub-element that includes information occurring prior to the first occurrence of the second delimiter that is not included in a different set of sub-elements or elements; and
   generating for display by the computing device the first portion of the document, wherein generating for display includes visually emphasizing the first set of elements and the complete sub-elements of the set of sub-elements with respect to incomplete sub-elements of the set of sub-elements.

2. The method of claim 1, further comprising:
   receiving a second portion of the document occurring immediately adjacent to the first portion of the document for display by the computing device, the second portion of the document including second multiple elements separated by one or more third delimiters;
   dividing by the computing device, the second multiple elements into
      1) a third set of one or more elements, wherein all of the elements of the third set of one or more elements are simultaneously displayed in its entirety at a time of display of the second portion of the document, and
      2) a fourth set of at least one element, wherein all of the elements of the fourth set of at least one element cannot be simultaneously displayed in its entirety at the time of display of the second portion of the document, and wherein the fourth set of at least one element does not include any elements included in the third set of one or more elements;

generating for display by the computing device the second portion of the document, wherein generating for display the second portion of the document includes visually de-emphasizing the first set of elements, and visually emphasizing the third set of elements of the second portion of the document with respect to the fourth set of at least one element.

3. The method of claim 2, wherein generating for display the second portion of the document further includes visually de-emphasizing the fourth set of at least one element of the second portion of the document with respect to the third set of one or more elements.

4. The method of claim 2, wherein visually de-emphasizing the first set of elements comprises fading the first set of one or more elements from an emphasized state to a de-emphasized state.

5. The method of claim 2, wherein generating for display the second portion of the document further includes:
scrolling the first portion of the document towards a top portion of the display device;
stopping displaying the first portion of the document not included in the second portion of the document on the display device; and
scrolling the second portion of the document from a bottom portion of the display device towards the top portion of the display device.

6. The method of claim 2, wherein generating for display the second portion of the document further includes:
scrolling the first portion of the document towards a bottom portion of the display device;
stopping displaying the first portion of the document not included in the second portion of the document on the display device; and
scrolling the second portion of the document from a top portion of the display device towards the bottom portion of the display device.

7. The method of claim 1, wherein each element of the first set of one or more elements includes information from the first portion of the document occurring 1) prior to and including a first occurrence of the one or more first delimiters within the first portion of the document, 2) between two distinct occurrences of the one or more first delimiters and including a latter occurrence of the two distinct occurrences of the one or more first delimiters in the first portion of the document, or 3) after a last occurrence of the one or more first delimiters.

8. The method of claim 1, wherein the first set of one or more elements comprises an element that includes information occurring after an occurrence of the one or more first delimiters in another portion of the document.

9. The method of claim 1, wherein generating for display the first portion of the document further includes visually de-emphasizing the second set of at least one element.

10. The method of claim 1, wherein the second delimiter comprises a paragraph separator, and wherein the second delimiter is one of a period, a colon, a semi-colon, a hyphen, or a comma.

11. The method of claim 1, wherein each of the one or more first delimiters comprises one of a paragraph separator, a period, a semi-colon, a colon, a hyphen, or a comma.

12. The method of claim 1, wherein the first set of one or more elements further comprises an element that includes information occurring prior to the first occurrence of the one or more first delimiters that is not included in a different set of elements in another portion of the document.

13. A non-transitory computer-readable storage medium encoded with instructions that if executed by one or more programmable processors of a computing device cause the computing device to perform operations comprising:
receiving a first portion of a document for display by the computing device, the first portion of the document including multiple elements separated by one or more first delimiters;
dividing the multiple elements into
1) a first set of one or more elements, wherein all of the elements of the first set of one or more elements are simultaneously displayed in its entirety at a time of display of the first portion of the document, and
2) a second set of at least one element, wherein all of the elements of the second set of at least one element cannot be simultaneously displayed in its entirety at the time of display of the first portion of the document, and wherein the second set of at least one element does not include any elements included in the first set of one or more elements;
dividing, by the computing device, a first element of the second set of elements into a set of sub-elements based on a second delimiter, wherein each sub-element of the set of sub-elements includes information from the first element occurring 1) prior to and including a first occurrence of the second delimiter within the first element, 2) between two distinct occurrences of the second delimiter and including a latter occurrence of the two distinct occurrences of the second delimiter in the first element, or 3) after a last occurrence of the second delimiter;
determining which sub-elements of the set of sub-elements are complete sub-elements based on the second delimiter, wherein a complete sub-element comprises a sub-element that includes information occurring between two distinct occurrences of the second delimiter within the first element, or a sub-element that includes information occurring prior to the first occurrence of the second delimiter that is not included in a different set of sub-elements or elements; and
generating for display by the computing device the first portion of the document, wherein generating for display includes visually emphasizing the first set of elements and the complete sub-elements of the set of sub-elements with respect to incomplete sub-elements of the set of sub-elements.

14. The non-transitory computer-readable storage medium of claim 13, wherein the operations further comprise:
receiving a second portion of the document occurring immediately adjacent to the first portion of the document for display by the computing device, the second portion of the document including second multiple elements separated by one or more third delimiters;
dividing by the computing device, the second multiple elements into
1) a third set of one or more elements, wherein all of the elements of the third set of one or more elements are simultaneously displayed in its entirety at a time of display of the second portion of the document, and
2) a fourth set of at least one element, wherein all of the elements of the fourth set of at least one element cannot be simultaneously displayed in its entirety at the time of display of the second portion of the document and wherein the fourth set of at least one element does not include any elements included in the third set of one or more elements;
generating for display by the computing device the second portion of the document, wherein generating for display the second portion of the document includes visually de-emphasizing the first set of elements, and visually emphasizing the third set of elements of the second portion of the document with respect to the fourth set of at least one element.

15. The non-transitory computer-readable storage medium of claim 14, wherein generating for display the second portion of the document further includes visually de-emphasizing the fourth set of at least one element of the second portion of the document with respect to the third set of one or more elements.

16. The non-transitory computer-readable storage medium of claim 14, wherein visually de-emphasizing the first set of one or more elements comprises fading the first set of elements from an emphasized state to a de-emphasized state.

17. The non-transitory computer-readable storage medium of claim 14, wherein the operation displaying the second portion of the document further comprises:
   scrolling the first portion of the document towards a top portion of the display device;
   stopping displaying the first portion of the document not included in the second portion of the document on the display device; and
   scrolling the second portion of the document from a bottom portion of the display device towards the top portion of the display device.

18. The non-transitory computer-readable storage medium of claim 13, wherein each element of the first set of one or more elements includes information from the first portion of the document occurring 1) prior to and including a first occurrence of the one or more first delimiters within the first portion of the document, 2) between two distinct occurrences of the one or more first delimiters and including a latter occurrence of the two distinct occurrences of the one or more first delimiters in the first portion of the document, or 3) after a last occurrence of the one or more first delimiters.

19. A device comprising:
   one or more hardware processors;
   a parsing module executable by the one or more hardware processors to:
      receive a first portion of a document for display by the device, the first portion of the document including multiple elements separated by one or more first delimiters,
      divide the multiple elements into
         1) a first set of one or more elements, wherein all of the elements of the first set of one or more elements are simultaneously displayed in its entirety at a time of display of the first portion of the document, and
         2) a second set of at least one element, wherein all of the elements of the second set of at least one element cannot be simultaneously displayed in its entirety at the time of display of the first portion of the document, and wherein the second set of at least one element does not include any elements included in the first set of one or more elements,
      divide a first element of the second set of elements into a set of sub-elements based on a second delimiter, wherein each sub-element of the set of sub-elements includes information from the first element occurring
         1) prior to and including a first occurrence of the second delimiter within the first element,
         2) between two distinct occurrences of the second delimiter and including a latter occurrence of the two distinct occurrences of the second delimiter in the first element, or
         3) after a last occurrence of the second delimiter, and determine which sub-elements of the set of sub-elements are complete sub-elements based on the second delimiter,
      wherein a complete sub-element comprises a sub-element that includes information occurring between two distinct occurrences of the second delimiter within the first element, or a sub-element that includes information occurring prior to the first occurrence of the second delimiter that is not included in a different set of sub-elements or elements; and
   a rendering module executable by the one or more hardware processors to generate for display by the computing device the first portion of the document, wherein generating for display includes visually emphasizing the first set of elements and the complete sub-elements of the set of sub-elements with respect to incomplete sub-elements of the set of sub-elements.

* * * * *